Nov. 6, 1928.

A. J. MUMMERT 1,690,423

PISTON RING

Filed Oct. 9, 1926

Inventor:
Arden John Mummert,
Henry Kinealy.
His Attorney.

Patented Nov. 6, 1928.

1,690,423

UNITED STATES PATENT OFFICE.

ARDEN JOHN MUMMERT, OF UNIVERSITY CITY, MISSOURI, ASSIGNOR TO McQUAY-NORRIS MANUFACTURING COMPANY, OF ST. LOUIS, MISSOURI, A CORPORATION OF DELAWARE.

PISTON RING.

Application filed October 9, 1926. Serial No. 140,625.

My invention relates to piston rings and more particularly to piston rings adapted for use in internal combustion engines and formed and arranged so as to be compressible axially whereby a tight fit may be had between the side faces of the piston ring and the side walls of the groove in the piston in which the ring is mounted so that leakage rearwardly around the piston ring will be prevented.

Heretofore piston rings have been provided with two or more circumferentially disposed rows of slots with the slots in one row staggered in relation to the slots in the adjacent row so that to some extent the ring may be axially compressed to bring the side faces closer together, but in manufacturing piston rings of this type many obstacles have been met. A great number of piston rings used in automobiles today are mounted on the small pistons of internal combustion engines having a comparatively great number of cylinders of small bore and the piston rings which are necessarily of small diameter are usually of narrow width. If two rows of slots are cut in such a piston ring in which the width of the cylinder contacting face is small it has been found that if the rows of slots are positioned far enough away from the side faces of the ring to leave substantially wide side annular portions to give the ring enough rigidity, the central annular portion left between the two rows of slots will be so narrow as to be easily broken and as to not give the side faces of the ring enough pressure against the side walls of the ring groove in the piston. In turn, if the two rows of slots are separated enough to leave a central annular portion therebetween of sufficient width to prevent its being broken in use and to give sufficient pressure of the side faces of the piston ring against the side walls of the ring groove, the result will be that the side annular portions between a row of slots and the adjacent side faces of the ring will be so narrow as to be easily broken even in handling and shipping.

The object of my invention is to provide a piston ring with slots therein so formed and arranged as to form a central annular portion of sufficient width to give the proper pressure of the side faces of the ring against the side walls of the ring groove in the piston and to form outer annular portions of the ring between a row of slots and the side face adjacent thereto of such formation as to be strong enough to withstand the shocks of shipping and of use in an internal combustion engine.

Figure 1:
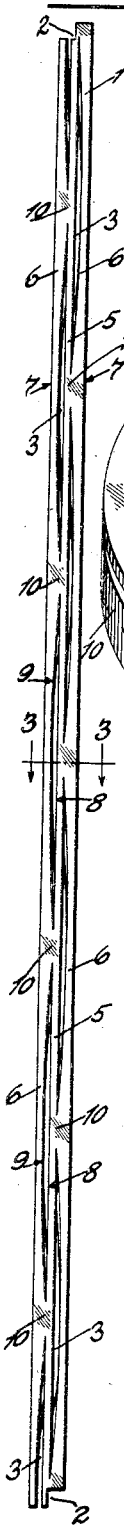
Figure 2:
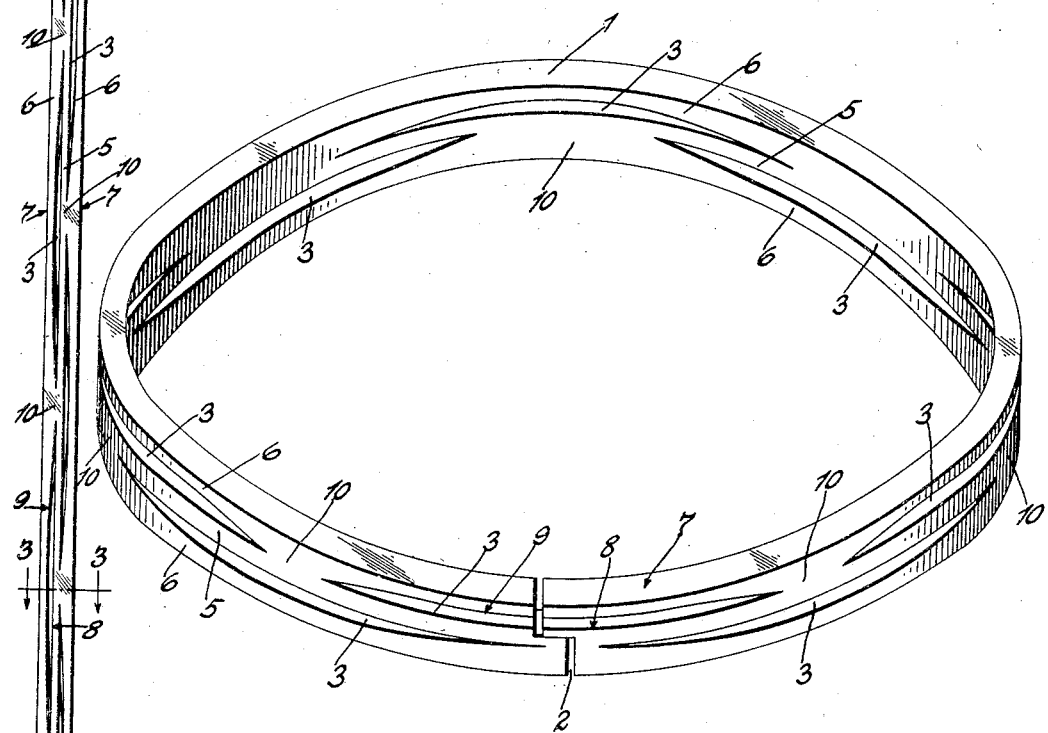
Figure 3:
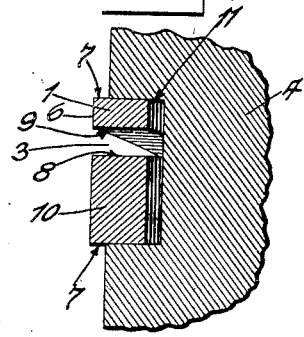

With these and other objects in view one form of piston ring embodying my invention is fully shown in the accompanying drawings wherein similar characters are used to designate similar parts: Fig. 1 is a view of a piston ring developed so as to show the whole outer circumference thereof; Fig. 2 is a perspective of the piston ring in its natural shape; Fig. 3 is a section along the lines 3—3 in Fig. 1 with the piston ring mounted in the piston ring groove of a piston.

In this embodiment of my invention the piston ring consists of a one-piece, resilient split band 1 provided with a step-cut joint 2. A plurality of slots 3 shaped as hereinafter described are arranged in circumferentially disposed rows as shown in Fig. 1 with the slots in one row staggered in relation to the slots in the other row. Preferably one of the slots extends across the joint 2, as shown, to make the portions of the ring adjacent the joint compressible.

When the slots are arranged in two rows as shown in the figures the piston ring will have a central annular portion 5 positioned between the rows of slots and side annular portions 6 positioned between a row of slots and the adjacent side face of the piston ring. Each of the slots 3 has the inner wall 8 thereof, that is, the wall nearest the other row of slots, substantially flat and substantially parallel with the side faces 7, and, therefore, the inner walls 8 of the slots in one row of slots will be substantially parallel to the inner walls of the slots in the other row and the sides of the central annular portion will be substantially parallel. The outer wall 9 of each of the slots 3, that is, the wall of the slot adjacent the nearest side face of the piston ring, is preferably substantially arcuate in shape and merges at its ends into the flat inner wall 8. In manufacturing this form of piston ring embodying my invention I prefer to use a small cutter having teeth tapering from top to bottom towards the outer edge thereof and if such a cutter is used to cut from the outer to the inner wall of the ring, the outer wall 9 will slope slightly downwardly from the front face of the piston ring to the rear face thereof, as shown in Fig. 1. Therefore, the opening of the slot on the rear face of the piston ring will be slightly shorter than the opening of the slot on the cylinder contacting face.

If the outer walls 9 of the slots 3 are arranged as shown to merge into the flat inner wall 8 the side annular portions 6 will be formed of a plurality of integral arched spans each extending between the bodies of metal left between the adjacent slots in a row. When the side annular portions are formed in this manner they will be rigid and strong. Likewise, if the slots are arranged as shown the central annular portion 5 will be substantially uniform in thickness throughout the whole circumference of the ring and, therefore, the pressure of the side faces 7 against the side walls of the piston ring groove 11 in the piston 4 will be uniform throughout the length of the piston ring. Moreover, the shape of these slots will not affect the axial compressibility of the piston ring and when the piston ring is compressed in the piston ring groove the inner walls 8 of the slots will be somewhat bowed outwardly and will be more nearly parallel with the outer walls 9.

It may be readily understood that embodiments of my invention may be varied within wide limits and details of construction may be changed without deviating from the spirit of my invention as embodied in the claims set forth below.

What I claim as new and desire to secure by Letters Patent, is:—

1. An axially compressible piston ring comprising a resilient split band having two circumferentially disposed rows of slots with the slots in one row staggered in relation to the slots in the other row, and said slots having the outer walls thereof substantially arcuate in shape and having the inner walls of the slots in one row substantially parallel to the inner walls of the slots in the other row.

2. An axially compressible piston ring comprising a resilient split band having two circumferentially disposed rows of slots with the slots in one row staggered in relation to the slots in the other row, and said slots having one wall thereof substantially flat and substantially parallel with a side face of said ring and having the other wall thereof merging at its ends into said flat wall.

3. An axially compressible piston ring comprising a resilient split band having two circumferentially disposed rows of slots with the slots in one row staggered in relation to the slots in the other row, and each of said slots having the inner wall thereof substantially flat and parallel to a side face of said ring and having the outer wall thereof arcuate in shape and merging at its ends into said inner wall.

4. An axially compressible piston ring comprising a resilient split band having two circumferentially disposed rows of slots with the slots in one row staggered in relation to the slots in the other row, and each of said slots having the outer wall thereof substantially arcuate in shape whereby the annular portion of the ring between a row of slots and the adjacent side face of the ring is formed of a plurality of integral arched spans each extending between the bodies of metal left between the ends of adjacent slots in the row and the inner walls of the slots in one row being substantially parallel to the inner walls of the slots in the other row.

In witness whereof I have signed my name to the foregoing specification.

ARDEN JOHN MUMMERT.